United States Patent
Leijon et al.

(10) Patent No.: US 7,259,491 B2
(45) Date of Patent: *Aug. 21, 2007

(54) ROTATING ASYNCHRONOUS CONVERTER

(75) Inventors: Mats Leijon, not provided (SE);
Thorsten Shütte, Västerås (SE);
Christian Sasse, Stafford (GB); Udo Fromm, München (DE); Stefan G. Johansson, Västerås (SE)

(73) Assignee: ABB AB, Västerås (SE)

( * ) Notice: Subject to any disclaimer, the term of this patent is extended or adjusted under 35 U.S.C. 154(b) by 160 days.

This patent is subject to a terminal disclaimer.

(21) Appl. No.: 11/093,296

(22) Filed: Mar. 30, 2005

(65) Prior Publication Data

US 2006/0006755 A1   Jan. 12, 2006

Related U.S. Application Data

(63) Continuation-in-part of application No. 08/973,306, filed on Apr. 10, 1998, now Pat. No. 6,906,447.

(51) Int. Cl.
*H02K 3/40* (2006.01)
*H02K 47/18* (2006.01)

(52) U.S. Cl. .................. 310/196; 310/114; 310/184; 174/DIG. 17; 174/DIG. 19; 174/DIG. 29; 363/174

(58) Field of Classification Search ........ 310/112–114, 310/196, 184; 174/DIG. 17–DIG. 33; 290/5–6, 290/52
See application file for complete search history.

(56) References Cited

U.S. PATENT DOCUMENTS

| 4,785,138 | A  | * | 11/1988 | Breitenbach et al. . 174/106 SC |
| 4,853,565 | A  | * | 8/1989  | Elton et al. .................... 310/45 |
| 5,094,703 | A  | * | 3/1992  | Takaoka et al. ............ 148/269 |
| 5,608,615 | A  | * | 3/1997  | Luce .......................... 363/102 |
| 5,754,420 | A  | * | 5/1998  | Luce .......................... 363/102 |
| 6,525,504 | B1 | * | 2/2003  | Nygren et al. .............. 318/700 |
| 6,906,447 | B2 | * | 6/2005  | Leijon et al. ............... 310/196 |

* cited by examiner

*Primary Examiner*—Burton Mullins
(74) *Attorney, Agent, or Firm*—Dykema Gossett PLLC

(57) ABSTRACT

A rotating asynchronous converter and a generator device having a first stator connected to a first AC network with a first frequency $f_1$, and a second stator connected to a second AC network with a second frequency $f_2$. The converter has a rotor which rotates in dependence of the first and second frequencies $f_1$, $f_2$. The stators each have at least one winding formed of at least one current-carrying conductor, and an insulation system, formed of semiconducting layers each forming an equipotential surface, and a solid insulation between the semiconducting layers.

36 Claims, 3 Drawing Sheets

ROTATING ASYNCHRONOUS CONVERTER

CROSS REFERENCE TO RELATED APPLICATION

This is a Continuation-in-part of application Ser. No. 08/973,306, filed on Apr. 10, 1998 now issued as U.S. Pat. No. 6,906,447, the entire contents of which is hereby incorporated by reference.

TECHNICAL FIELD OF THE INVENTION

The present invention relates to a rotating asynchronous converter and the use of such converter.

The present invention also relates to a generator device.

BACKGROUND OF THE INVENTION

In a number of situations exchange of power must be performed between AC networks with different or at least not synchronous frequencies. The most frequent cases are the following:

1. Connection of not synchronous three phase networks with equal rating frequencies, e.g. between eastern and western Europe.

2. Connection of three phase networks with different frequencies, most usually 50 Hz/60 Hz (e.g. Japan, Latin America).

3. Connection of a three phase network and a low frequency, one/two phase network for railway supply, in Europe 50 Hz/16.2/3 Hz, in USA 60 Hz/25 Hz.

4. The use of rotating asynchronous converters as a series compensation in long distance AC transmission.

Today, the connection is performed with the aid of power electronics and DC intermediate link. In the above mentioned cases 2 and 3 the connection can further be performed with the aid of matrix converters. In case of synchronous, but different frequencies in the above mentioned cases 2 and 3 the connection can further be performed with the aid of rotating converters comprising mechanically connected synchronous machines.

In the article, "Investigation and use of asynchronized machines in power systems", Electric Technology USSR, No. 4, pp. 90-99, 1985, by N. I. Blotskii, there is disclosed an asynchronized machine used for interconnection of power systems, or their parts, which have different rated frequencies, or the same rated frequencies, but differing in the degree of accuracy with which it must be maintained. The structure of the asynchronized machine is disclosed in FIG.

1. The asynchronized machine includes an electric machine 1 which is a machine with a conventional three-phase stator and either a non-salient-pole symmetrical rotor or a salient-pole or non-salient-pole electrically asymmetrical rotor, the phase leads being connected to slip rings; an exciter 2 which is a cycloconverter or reversing controlled rectifier, the cycloconverter supply 3 or 4, a regulator 5 forming the control law required for the rotor ring voltages and the main machine rotor angle and speed 6, voltage 7 and current 9 sensors of the stator and rotor.

In the article, "Performance Characteristics of a Wide Range Induction type Frequency Converter", IEEMA Journal, Vol. 125, No. 9, pp. 21-34, September 1995, by G. A. Ghoneem, there is disclosed an induction-type frequency converter as a variable frequency source for speed control drives of induction motors. In FIG. 2 there is disclosed a schematic diagram of the induction-type frequency converter. The induction-type frequency converter consists of two mechanically and electrically coupled wound rotor induction machines A, B. The stator windings of one of them (A) are connected to 3-phase supply at line frequency (Vi, Fi), while the stator windings of the other machine (B) represent the variable frequency output (Vo, Fo). The rotor windings 10, 12 of the two machines are connected together with special arrangement. The converter is driven by a variable speed primemover 14, a DC motor can be used.

Static converters have drawbacks such as relatively low efficiency (ca 95%) owing to the losses in the semi-conductors, harmonics which have to be compensated with the aid of filters. The use of DC intermediate links leads to the use of special converter transformers with very complex design. The fillers are leading to a great need of space for the total assembly. Conventional rotating converters are not designed for high voltages, so a transformer is needed at each side for the connection to the AC network. The efficiency then becomes comparable to or even lower than the efficiency of a static converter.

SUMMARY OF THE INVENTION

The object of the invention is to solve the above mentioned problems and to provide a rotating asynchronous converter for connection of AC networks with equal or different frequencies. This object is achieved by providing a rotating asynchronous converter with advantageous features.

Accordingly, the converter comprises a first stator connected to a first AC network with a first frequency $f_1$, and a second stator connected to a second AC network with a second frequency $f_2$. The converter also comprises a rotor means which rotates in dependence of the first and second frequencies $f_1$, $f_2$. At least one of the stators each comprise at least one winding, wherein each winding comprises at least one current-carrying conductor, and each winding comprises an insulation system, which comprises on the one hand at least two semiconducting layers, wherein each layer constitutes substantially an equipotential surface, and on the other hand between them is arranged a solid insulation.

According to another embodiment of the converter, at least one of said windings also comprises an insulation system, which in respect of its thermal and electrical properties permits a voltage level in said rotating asynchronous converter exceeding 36 kV.

An important advantage of the present invention is that it is possible to achieve a connection of two not synchronous networks without the further use of transformers or any other equipment. Another advantage is the high efficiency, which is expected to be 99%.

By designing the insulation system, which suitably is solid, so that it in thermal and electrical view is dimensioned for voltages exceeding 36 kV, the system can be connected to high voltage power networks without the use of intermediate step-down-transformers, whereby is achieved the above referenced advantages. Such a system is preferably, but not necessarily, designed in such a way that it comprises the features of the rotating asynchronous converter.

Another object of the invention is to solve the above mentioned problems and to provide a generator device with variable rotational speed. This object is achieved by providing a generator device with advantageous features.

Accordingly, the generator device comprises a stator connected to an AC network with a frequency $f_2$, a first cylindrical rotor connected to a turbine, which rotates with a frequency $f_1$. The generator device also comprises a rotor means which rotates in dependence of the frequencies $f_1$, $f_2$. The stator and the first cylindrical rotor each comprises at least one winding, wherein each winding comprises at least one current-carrying conductor, and each winding comprises an insulation system, which comprises on the one hand at least two semiconducting layers, wherein each layer constitutes substantially an equipotential surface, and on the other hand between them is arranged a solid insulation.

According to another embodiment of the generator device, it comprises a stator connected to an AC network with a frequency $f_2$, and a first cylindrical rotor connected to a turbine, which rotates with a frequency $f_1$. The generator device also comprises a rotor means which rotates in dependence of the frequencies $f_1$, $f_2$. The stator and the first cylindrical rotor each comprises at least one winding, wherein each winding comprises a cable comprising at least one current-carrying conductor, each conductor comprises a number of strands, around said conductor is arranged an inner semiconducting layer, around said inner semiconducting layer is arranged an insulating layer of solid insulation, and around said insulating layer is arranged an outer semiconducting layer.

The above mentioned and other preferable embodiments of the present invention are specified in the dependent claims.

In a certain aspect of the present invention it relates to the use of the invented asynchronous converter in specific applications such as those specified in the claims, in which applications the advantages of the invented device are particularly prominent.

Embodiments of the invention will now be described with a reference to the accompanying drawings, in which:

DETAILED DESCRIPTION OF EMBODIMENTS

Figure 1:
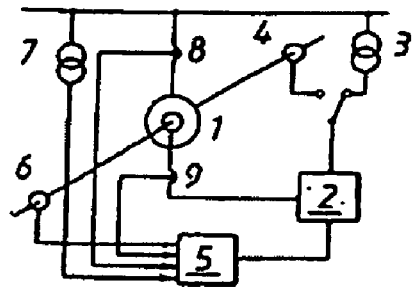
FIG. 1 shows a schematic diagram of an asynchronized machine used for interconnection of power system according to the state of the art.
Figure 2:
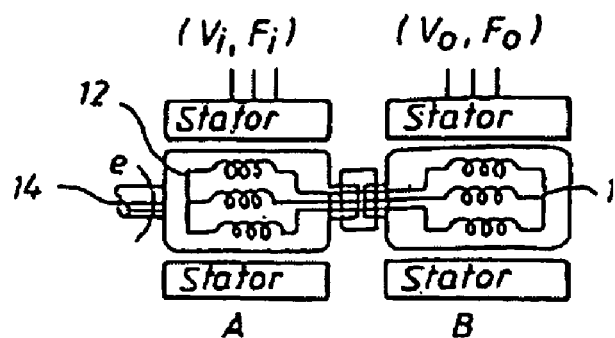
FIG. 2 shows a schematic diagram of an induction-type frequency converter as a variable frequency source according to the state of the art.
Figure 3:
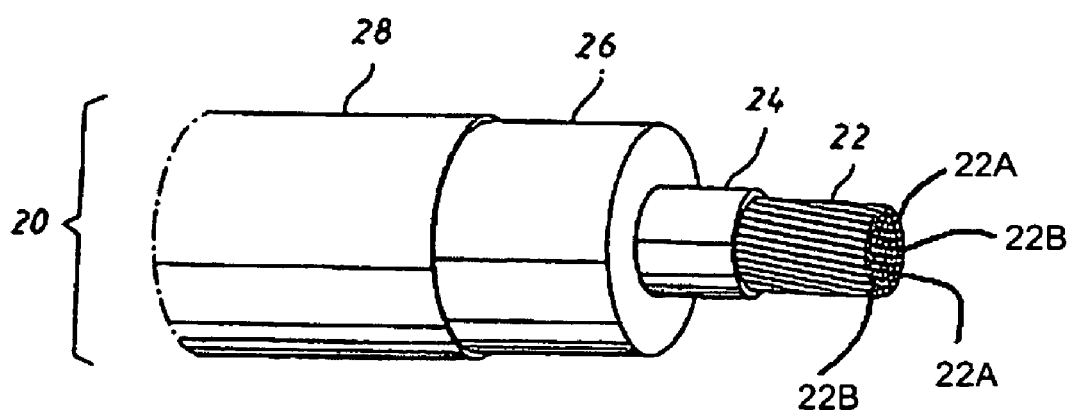
FIG. 3 shows the parts included in the current modified standard cable.

A preferred embodiment of the improved cable is shown in FIG. 3. The cable 20 is described in the figure as comprising a current-carrying conductor 22 which comprises transposed both non-insulated 22A and insulated strands 22B. Electromechanically transposed, extruded there is an inner semiconducting casing 24 which, in turn, is surrounded by an extruded insulation layer 26. This layer is surrounded by an external semiconducting layer 28. The cable used as a winding in the preferred embodiment has no metal shield and no external sheath.

Preferably, at least two of these layers, and most preferably all of them, has equal thermal expansion coefficients. Hereby is achieved the crucial advantage that in case of thermal motion in the winding, one avoids defects, cracks or the like.

Figure 4:
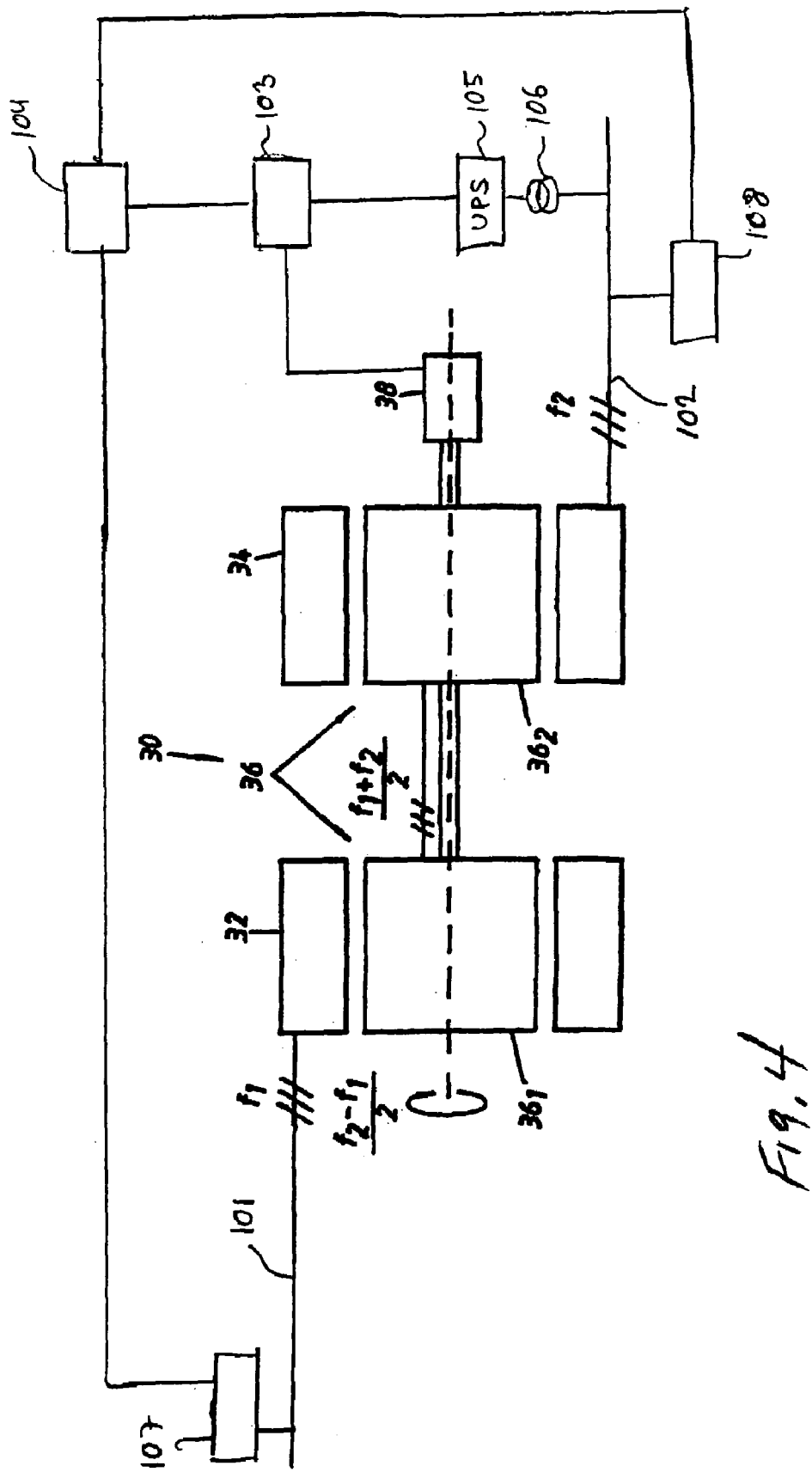
FIG. 4 shows an embodiment of a rotating asynchronous converter according to the present invention.

FIG. 4 shows an embodiment of a rotating asynchronous converter 30 according to the present invention. The rotating asynchronous converter 30 is used for connection of AC networks with equal or different frequencies. The converter 30 comprises a first stator 32 connected to a first AC network (grid) 101 with a first frequency $f_1$, and a second stator 34 connected to a second AC network (grid) 102 with a second frequency $f_2$. In the disclosed embodiment the stators 32, 34 are three phase stators 32, 34 comprising three windings each, wherein each winding comprises at least one current-carrying conductor, and each winding comprises an insulation system, which comprises on the one hand at least two semiconducting layers, wherein each layer constitutes substantially an equipotential surface, and on the other hand between them is arranged a solid insulation. The windings can also be formed of a cable of the type disclosed in FIG. 3.

The converter 30 also comprises a rotor means 36 which rotates in dependence of the first and second frequencies $f_1$, $f_2$. In the disclosed embodiment the rotor means 36 comprises two electrically and mechanically connected three phase rotors 36$_1$, 36$_2$, which are concentrically arranged in respect of said stators 32, 34. The electrical connection of the rotors include a electrical coupling device (not shown) for connection of the windings (not shown) in a suitable way.

The converter 30 also comprises an auxiliary device 38 connected to said rotors 36$_1$, 36$_2$ for starting up of the rotors 36$_1$, 36$_2$ to a suitable rotation speed before connection of said converter 30 to said AC networks.

Each rotor 36$_1$, 36$_2$ comprises a low voltage winding (not disclosed). When the first stator 32 is connected to a three phase AC network with the frequency $f_1$ and the second stator 34 is connected to a three phase AC network with the frequency $f_2$, the rotors 36$_1$, 36$_2$ will during no load operation rotate with the frequency $(f_1-f_2)/2$ and the stator current has the frequency $(f_1+f_2)/2$. During no load operation, mechanical power is only consumed to maintain the rotation.

In order to transfer power from the first network 101 to the second network 102, or from the second network 102 to the first network 101, the auxiliary device 38 is used to create an air gap between the first stator and rotor and the second stator and the rotor. Thereby the magnetic fields create a current in the winding connecting the two rotors and power is transferred between the two networks 101, 102. The power to drive the auxiliary device in order to create said air gap is very small compared with the power transferred, as the system for the power is transferred as in a transformer.

Thus, by increasing the rotation speed of the auxiliary device or decrease the rotation speed, the speed of the rotor device is changed, as there is a mechanical connection between the auxiliary device and the rotor device. Hereby it is possible to change the direction of the power transfer between the networks 101, 102.

The auxiliary device 38 is preferable a DC-machine or a machine with permanent rotor. Such devices are regulated by an adjustable speed drive 203 in known manner. The adjustable speed drive 203 is controlled a control system 104.

According to one embodiment of the invention the auxiliary device 38 is powered from the network 102 via a transformer 106. When the device 38 is operated to decrease the rotation of the rotor devices, some power are feed back to the network 102.

According to one embodiment, a means for energy storage UPS (Uninterruptible Power Device) 105 is arranged to power the auxiliary device 38 at certain operation conditions, where extra power is required, such as at short voltage dips (sags) at the network 102.

According to another embodiment of the invention, the asynchronous converter is provided with reactive compensation means in form of a reactive power device 107 at the first network 101 and/or a reactive power device 108 at the second network 102. Examples of such reactive compensation means are capacitors, reactors, SVC's (Static VAR Compensator), STATCOM's (Static Compensator). The reactive power devices are controlled by the control system 104 in known manner.

The efficiency with such a converter will be very high (~99%) for small frequency differences due to the fact that all power is transmitted as in a transformer.

At the reactive power device according to the invention the power are transferred between the networks by magnetic air gaps, a first air gap at the stator/rotor device connected to network 101 and a second air gap at the stator/rotor device connected to the network 102. No power is thus transferred by slip-rings as in prior art so called rotating transformers. A drawback with slip-rings is that such require regular maintenance to operate property and slip-rings are also difficult to design for operation at high voltages.

Figure 5:
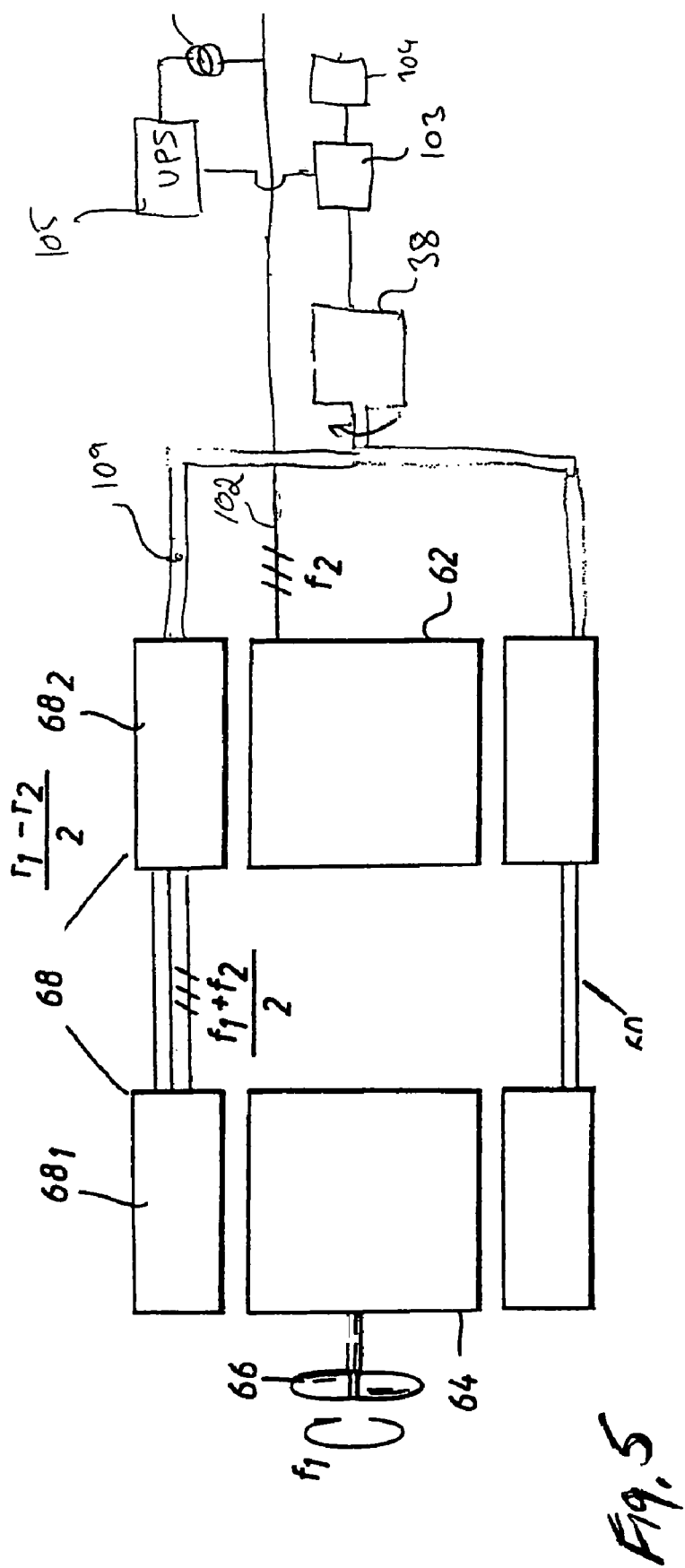
FIG. 5 shows an embodiment of a generator device according to the present invention.

In FIG. 5 there is disclosed an embodiment of a generator device 60 with variable rotational speed according to the present invention. The generator device 60 comprises a stator 62 connected to an AC network (grid) 102 with a frequency $f_2$ and a first cylindrical rotor 64 connected to a turbine 66, which rotates with a frequency $f_1$. The generator device 60 comprises also a rotor means 68 which rotates in dependence of the frequencies $f_1$, $f_2$. The stator 62 and said first cylindrical rotor 64 each comprises at least one winding (not disclosed). Each winding comprises at least one current-carrying conductor, and each winding comprises an insulation system, which comprises on the one hand at least two semiconducting layers, wherein each layer constitutes substantially an equipotential surface, and on the other hand between them is arranged a solid insulation. Each winding can in another embodiment also comprise a cable of the type disclosed in FIG. 3.

The rotor means 68 comprises two electrically and mechanically connected rotors $68_1$, $68_2$, which rotors $68_1$, $68_2$ are hollow and arranged concentrically around said stator 62 and said cylindrical rotor 64. The stator 62 in the disclosed embodiment has a cylindrical shape. Each rotor $68_1$, $68_2$ comprises a low voltage winding (not disclosed) and they are rotating with the frequency $(f_1-f_2)/2$ when said generator device is in operation. The frequency of the rotor current will be $(f_1+f_2)/2$ when the generator device 60 is in no load operation. This generator device 60 is now disconnected from the power frequency and can be operated with the frequency as an optimizeable parameter. This generator device 60 will also give a better efficiency and power matching than a conventional generator.

The generator device also include an auxiliary device 38, which is mechanically connected to rotor device 68 with a (schematically shown) drive means 109.

This auxiliary device is used during start-up operation in similar way as at the rotating asynchronous devise described above. In order to transfer power from the first cylindrical rotor to the network 102, the auxiliary device 38 is used to create an air gap between the first cylindrical rotor 64 and the first rotor $68_1$ and second rotor $68_2$ and the cylindrical stator 62. Thereby the magnetic fields create a current in the winding connecting the two rotors $68_1$, $68_2$ and power is transferred between the network 102 via the stator 62. The power to drive the auxiliary device in order to create said air gap is very small compared with the power transferred, as the system for the power is transferred as in a transformer.

Thus, by increasing the rotation speed of the auxiliary device or decrease the rotation speed, the speed of the rotor device 68 is changed, as there is a mechanical connection 109 between the auxiliary device and the rotor device. Hereby it is possible to regulate the power transfer between the turbine 66 and the network 102, keeping the frequency $f_2$ constant irrespectively of the frequency $f_1$ of the turbine 66.

The auxiliary device 38 is preferable a DC-machine or a machine with permanent rotor. Such devices are regulated by an adjustable speed drive 203 in known manner. The adjustable speed drive 203 is controlled a control system 104.

According to one embodiment of the invention the auxiliary device 38 is powered from the network 102 via a transformer 106. When the device 38 is operated to decrease the rotation of the rotor devices, some power are feed back to the network 102.

According to one embodiment, a means for energy storage UPS (Uninterruptible Power Device) 105 is arranged to power the auxiliary device 38 at certain operation conditions, where extra power is required, such as at short voltage dips (sags) at the network 102.

At the generator device according to the invention the power are transferred by magnetic air gaps. No power is thus transferred by slip-rings and the drawbacks with slip-rings are thus avoided.

The disclosed embodiments only show connection of three phase networks, but the invention is also applicable for connection of a three phase network, wherein one stator has a one/two phase application. The invention can also be used for connection of a three phase network and a one/two phase network, wherein one stator having a three phase application is connected via a Scott-connection or another symmetrical connection to a one/two phase network. The invention is also applicable to more than two stators and rotor parts to connect more than two AC networks. The only condition is that only two not synchronous networks are connected.

The invention is not limited to the embodiments described in the foregoing. It will be obvious that many different modifications are possible within the scope of the following claims.

The invention claimed is:

1. A rotating asynchronous converter for connection of AC networks with equal or different frequencies, wherein the converter comprises a first stator connected to a first AC network with a first frequency $f_1$, and a second stator connected to a second AC network with a second frequency $f_2$, wherein the converter also comprises a rotor which comprises two electrically and mechanically connected rotors, which are concentrically arranged with respect to said stators, and which rotates in dependence of the first and second frequencies $f_1$, $f_2$, and said converter further comprises an auxiliary device connected to said rotor, and in that at least one of said stators includes at least one winding forming at least one uninterrupted turn, said winding including a current-carrying conductor comprising a plurality of insulated conductive elements and at least one uninsulated conductive elements, and a magnetically permeable, electric field confining insulation covering surrounding the conductor, including an inner layer having semiconducting properties in electrical contact with the conductor, an insulation layer surrounding the inner layer in intimate contact with the inner layer and an outer layer having semiconducting properties surrounding the insulation layer and in intimate contact with the insulation layer, wherein each layer constitutes substantially an equipotential surface.

2. The rotating asynchronous converter according to claim 1, wherein the auxiliary device is arranged for starting up the rotors to a suitable rotation speed before connection of said converter to AC networks.

3. The rotating asynchronous converter according to claim 2, wherein the suitable rotation speed at connection to the AC networks is when the rotors are rotating with the frequency $(f_1-f_2)/2$ and the rotor current has the frequency $(f_1=f_2)/2$.

4. The rotating asynchronous converter according to claim 2, wherein the potential of the inner one of said layers is substantially equal to the potential of the conductor.

5. The rotating asynchronous converter according to claim 2 wherein an outer one of said layers is arranged to constitute substantially an equipotential surface surrounding said conductor.

6. The rotating asynchronous converter according to claim 5, wherein the cable has a diameter of about 20-250 mm and a conductor area of about 80-3000 mm$^2$.

7. The rotating asynchronous converter according to claim 1, wherein the auxiliary device is arranged for creating a torque in the air gap between the rotor and stator during operation.

8. The rotating asynchronous converter according to claim 7, wherein said outer layer is connected to a specific potential.

9. The rotating asynchronous converter according to claim 8, wherein said specific potential is ground potential.

10. The rotating asynchronous converter according to claim 1, wherein the auxiliary device is powered by the network via an adjustable speed drive and comprises a control system.

11. The rotating asynchronous converter according to claim 1, wherein the auxiliary device comprises an uninterruptible power supply to handle short voltage dips at the network.

12. The rotating asynchronous converter according to claim 1, wherein the rotating asynchronous converter includes means for reactive power compensation.

13. The rotating asynchronous converter according to claim 1, wherein said winding comprises also an insulation system, wherein with respect to its thermal and electrical properties permits a voltage level in said rotating asynchronous converter exceeding 36 kV.

14. The rotating asynchronous converter according to claim 1, wherein at least one of said semiconducting layers has a coefficient of thermal expansion equal to that of said solid insulation.

15. The rotating asynchronous converter according to claim 1, wherein at least two of said layers have substantially equal thermal expansion coefficients.

16. The rotating asynchronous converter according to claim 1, wherein said current-carrying conductor comprises a number of strands, only a minority of said strands being non-isolated from each other.

17. The rotating asynchronous converter according to claim 1, wherein each of said two layers and said solid insulation is connected to an adjacent layer or solid insulation along substantially the whole connecting surface.

18. The generator device according to claim 1, wherein the auxiliary device comprises an uninterruptible power supply to handle short voltage dips at the network.

19. The use of a rotating asynchronous converter in accordance with claim 1 for connection of a non-synchronous three phase networks with equal rating frequencies.

20. The use of a rotating asynchronous converter in accordance with claim 1 for connection of three phase networks with different frequencies.

21. The use of a rotating asynchronous converter in accordance with claim 1 as a series compensation in long distance AC transmission.

22. The use of a rotating asynchronous converter in accordance with claim 1 for reactive power compensation.

23. A generator device operable with variable rotational speed, wherein the generator device comprises a cylindrical stator connected to an AC network with a frequency $f_2$, a first cylindrical rotor connected to a turbine, which rotates with a frequency $f_1$, wherein said generator device comprises a rotor means being rotatable in dependence of the frequencies $f_1$, $f_2$, and said generator further comprises an auxiliary device mechanically connected to said rotor means, which rotor means comprises a first rotor and a second rotor, which rotors are hollow and electrically and mechanically connected, wherein said first rotor is arranged concentrically around said first cylindrical rotor and said second rotor is arranged concentrically around said cylindrical stator and said stator and said first cylindrical rotor each includes at least one winding forming at least one uninterrupted turn, said winding comprising at least one current-carrying conductor, a plurality of insulated conductive elements and at least one uninsulated conductive element and a magnetically permeable electric field confining insulation system, including an inner layer in intimate contact with the conductor, and an outer layer having semiconducting properties surrounding the insulating layer in intimate contact with the insulating layer, wherein each layer forms a substantially equipotential surface surrounding the conductor.

24. The rotating generator according to claim 23, wherein the auxiliary device is arranged for starting up the rotor means to a suitable rotation speed before connection of said stator to AC networks.

25. The rotating generator according to claim 24, wherein the suitable rotation speed at connection to the AC networks is when the rotors are rotating with the frequency $(f_1-f_2)/2$ and the rotor current has the frequency $(f_1=f_2)/2$.

26. The generator device according to claim 23, wherein the auxiliary device is arranged for creating a torque in the air gap between the first cylindrical rotor and the first rotor and second rotor and the cylindrical stator during operation.

27. The generator device according to claim 23, wherein the auxiliary device is powered by the network via an adjustable speed drive and comprises a control system.

28. The generator device according to claim 23, wherein said winding comprises an insulation system, which with rescect to its thermal and electrical properties permits a voltage level in said rotating asynchronous converter exceeding 36 kV.

29. The generator device according to claim 23, wherein at least one of said semiconducting layers has a coefficient of thermal expansion equal to that of said solid insulation.

30. The generator device according to claim 29, wherein the potential of the inner one of said layers is substantially equal to the potential of the conductor.

31. The generator device according to claim 29, wherein an outer one of said layers is arranged to constitute substantially an equipotential surface surrounding said conductor.

32. The generator device according to claim 31, wherein said outer layer is connected to a specific potential.

33. The generator device according to claim 32, wherein said specific potential is ground potential.

34. The generator device according to claim 23, wherein at least two of said layers have substantially equal thermal expansion coefficients.

35. The generator device according to claim 23, wherein said current-carrying conductor comprises a number of strands, only a minority of said strands being non-isolated from each other.

36. The generator device according to claim 23, wherein each of said two layers and said solid insulation is connected to an adjacent layer or solid insulation along substantially the whole connecting surface.

* * * * *